April 1, 1958   G. E. ALGATT ET AL   2,828,658
RADIUS TURNING ATTACHMENT FOR TURRET LATHE
Filed Sept. 2, 1954
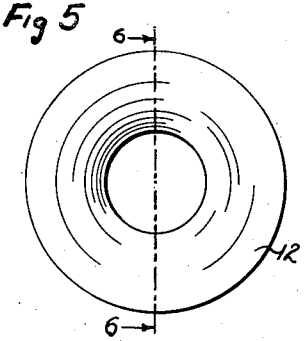
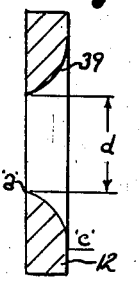
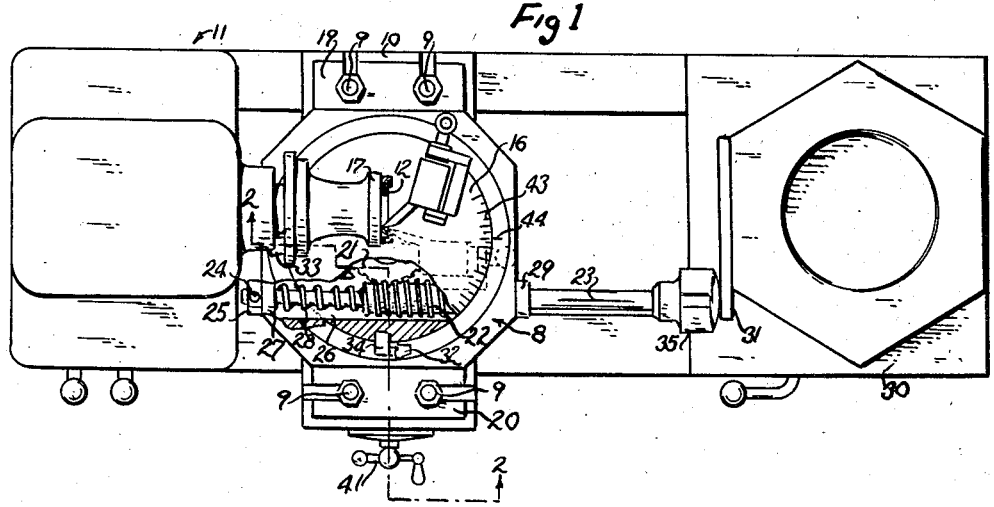
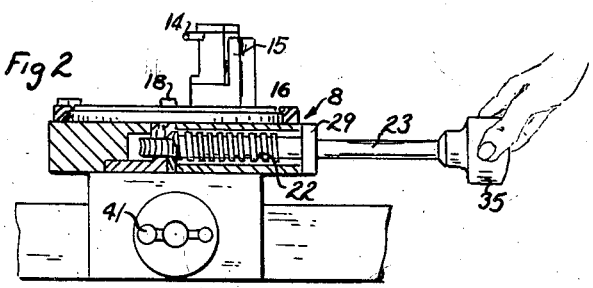
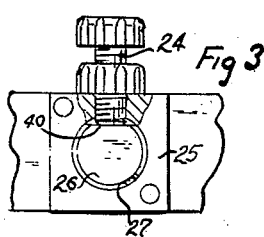
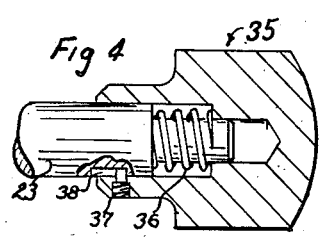
INVENTORS
G. E. ALGATT
C. L. BEISINGER
E. A. KROMER
BY
ATTORNEY

United States Patent Office 2,828,658
Patented Apr. 1, 1958

2,828,658

RADIUS TURNING ATTACHMENT FOR TURRET LATHE

George E. Algatt, Clarence L. Beisinger, and Ernest A. Kromer, Allentown, Pa., assignors to Western Electric Company, Incorporated, New York, N. Y., a corporation of New York Application September 2, 1954, Serial No. 453,724

1 Claim. (Cl. 82—12)

This invention relates to a radius turning attachment for lathes and has for its principal object a radius turning attachment which may be operated either manually on a conventional lathe or automatically on a turret lathe.

According to the general features of the invention, a cutting tool is mounted to a turntable on the cross-slide of a lathe, the turntable being rotated by a worm gear driven by a worm screw to move the tool along the cutting arc. When the attachment is used on a conventional lathe, the screw is rotated manually by the operator but as applied to a turret lathe, the screw is not rotated but rather is used as a rack by being pushed axially by the turret feed mechanism.

According to a feature of the invention, the travel of the turntable is accurately determined by the setting of adjustable stops therefor and the stop for the power feed mechanism of the turret, need only be roughly set for feeding slightly more than that required for the turntable, a compressible overtravel compensator being provided for absorbing the overtravel of the power feed mechanism.

These and other features of the invention will be more fully understood from the following detailed description taken in conjunction with the accompanying drawing, in which:

Fig. 1 is a partially broken away plan view of a turret lathe with an attachment according to the invention mounted thereon, Fig. 2 is a side elevational view of the attachment as seen along the plane of line 2—2 of Fig. 1, Fig' 3 is a side elevational view of the worm shaft extension and locking screw therefor, Fig. 4 is a sectional view of the overtravel compensator for the end of the worm shaft, and Figs. 5 and 6 are plan and cross-sectional views along the plane of line 6—6, respectively, of a piece part illustrating the type of curved surface that may be machined with the device of the present invention.

Referring now to the drawing in general, the attachment consists of a main housing 8, a turntable 16 for supporting a cutting tool 14, a worm gear 21 for rotating the turntable and a spring mounted worm screw 22 and drive shaft 23 therefor. The piece part 12 to be machined is mounted in a holding fixture 17 on the spindle of the lathe.

The attachment is secured to the movable cross-slide 10 of the lathe by means of bolts 9 through the slotted housing extensions 19 and 20. The tool holder is of conventional design being adjustable vertically and may be positioned radially on the turntable also in conventional manner and as such is not shown here in detail.

The turntable is rotated by a worm gear 21 attached to the turntable and rotatably mounted on the pivot pin 18 therefor. The worm screw 22 for the gear 21 is mounted on the housing 8 so that it may be utilized as a worm screw simply by manual rotation of the drive shaft 23 in which case a locking screw 24 in a bushing supporting portion 25, for the worm extension shaft 26, must be unscrewed to remove or clear it from the flat surface 40 on the shaft. A spring 28 normally forces the worm screw 22 toward or, as in the manual rotation of the worm, against the bushing for the drive shaft 23 in the housing portion 29.

To use the power feed mechanism of the turret 30 the locking screw 24 is turned down to make sliding engagement with the flat surface 40 on the shaft 26 so that the shaft 26 may be moved axially without rotation thereof. The worm screw 22 is locked against rotation to prevent ununiform rotation of the cutting tool due to rotation of the screw while the screw is used as a rack. In addition, adjustable stops 32 and 33 on the housing 8 of the attachment, which cooperate with an arm 34 on the turntable, must be accurately set to limit the rotary movement of the turntable as required for the cut to be made on the piece part 12. The turntable may be provided with a scale 43 and a reference index 44 to facilitate fixing the stops. The worm screw is driven axially by the turret power feed mechanism, the driving member of which is shown diagrammatically as member 31. The conventional limit stop (not shown) for this driving member 31 is also set to correspond to the stop 33 on the attachment, this end of feed stop may, however, be set so that the driving member 31 will continue to be driven a slight amount after the table is stopped in order to insure full rotation thereof. The stop 32 on the attachment prevents the turntable from counterclockwise rotation due to the counter-clockwise force normally exerted thereon by the compressed spring 28 on the worm screw 22 when the turntable is so positioned that the worm screw 22 is held off of the bushing in housing portion 29. As the shaft 23 is pushed to drive worm screw 22 as a rack, rotary movement thereof being prevented by the lock screw 24 on the flat surface 40 of shaft 26, the turntable is rotated until the cutting tool 14 reaches the final position as shown in dashed lines in Fig. 1, when the arm 34 on the turntable engages the stop 33 to prevent further rotation thereof.

With the end of feed stop for the turret drive member 31 set for a slight overtravel, the shaft end member 35 which is movable axially on the shaft prevents further movement of the turntable. The member 35 is provided with a compressed spring 36 which normally holds the member 35 as shown in Fig. 4 but which when the turntable is stopped will be compressed or forced axially along the shaft by the driving member 31, a retaining screw 37 for the member 35 being moved along a slot therefor in the shaft 23.

The curved surface 39 on the piece part 12, as seen in the cross-sectional, enlarged view of the piece part in Fig. 6, is machined on the lathe with the attachment by mounting, in the holding fixture 17, a blank piece part having a central cylindrical hole with the diameter equal to the finished minimum diameter $d$. The minimum or "Start" stop 32 is set so that the cutting tool 14 is positioned with the central hole to start the cut at $a$ (Fig. 6), and the maximum or "End" stop 33 is set so that the tool 14 will be at $c$ when the turntable is stopped. Of course, different types of curved surfaces may be cut with this attachment by changing the setting of the cross-slide 10 (by operating handle 41) or by changing the radial, annular or elevational positioning of the cutting tool on the turntable.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

A radius turning attachment for a turret lathe having a turret power feed mechanism and a cross-slide, said attachment comprising a main housing having means for mounting it on the cross-slide of the lathe, a turntable mounted in the housing, a cutting tool and means for supporting the tool on the turntable, a worm gear in the housing for the turntable, a worm screw for the gear mounted for rotary and axial movement, resilient means for exerting an axial force on the worm screw, means for locking the worm screw against rotary movement, limit stops for restricting the rotary movement of the turntable, means for driving the worm screw axially, with the turret power feed mechanism, against the resilient means to rotate the turntable between the stops and a resilient overtravel compensator for the worm screw compressible by the power feed mechanism when the turntable is prevented from movement by one of the limit stops.

References Cited in the file of this patent

UNITED STATES PATENTS

| | | |
|---|---|---|
| 1,435,453 | Davis | Nov. 14, 1922 |
| 1,980,444 | Scott | Nov. 13, 1934 |
| 2,089,078 | Tyson | Aug. 3, 1937 |
| 2,163,035 | Grupe | June 20, 1939 |
| 2,168,633 | Smith | Aug. 8, 1939 |
| 2,250,161 | Johnson | July 22, 1941 |
| 2,423,941 | Laisne | July 15, 1947 |
| 2,544,918 | Demeulenaere | Mar. 13, 1951 |
| 2,697,364 | Koch | Dec. 21, 1954 |